United States Patent
Nakajo

(10) Patent No.: US 7,359,298 B2
(45) Date of Patent: Apr. 15, 2008

(54) OPTICAL PICKUP DEVICE FOR WRITING INFORMATION TO AN OPTICAL DISK

(75) Inventor: Yukihisa Nakajo, Yokohama (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 614 days.

(21) Appl. No.: 10/872,811

(22) Filed: Jun. 21, 2004

(65) Prior Publication Data

US 2005/0099917 A1    May 12, 2005

(30) Foreign Application Priority Data

Nov. 12, 2003    (JP)    ............................. 2003-382593

(51) Int. Cl.
*G11B 15/52*    (2006.01)
(52) U.S. Cl. ................. 369/47.51; 369/59.11
(58) Field of Classification Search ..................... None
See application file for complete search history.

(56) References Cited

U.S. PATENT DOCUMENTS

2002/0021638 A1    2/2002    Ohgake
2002/0167878 A1*    11/2002    Nagano .................... 369/59.11
2003/0081517 A1*    5/2003    Kim ........................ 369/47.47
2003/0185123 A1*    10/2003    Sato ........................ 369/47.53
2004/0145985 A1*    7/2004    Osakabe .................. 369/47.53
2004/0179451 A1    9/2004    Morishima et al.

FOREIGN PATENT DOCUMENTS

| EP | 1 189 211 A1 | 3/2002 |
| JP | 2002-183960 | 6/2000 |
| JP | 2001-291261 | 10/2001 |
| JP | 2001-297437 | 10/2001 |
| JP | 2002-056531 | 2/2002 |
| JP | 2002-183960 | 6/2002 |

* cited by examiner

*Primary Examiner*—Paul W. Huber
(74) *Attorney, Agent, or Firm*—Volentine & Whitt, PLLC

(57) ABSTRACT

The present invention relates, in general, to an optical pickup and apparatus for recording and reproducing information on and from an optical recording medium, such as a compact disk or a digital versatile disk and, more particularly, to an optical pickup device, which improves a write quality while reducing efforts to set write strategies at the time of designing a pickup drive.

18 Claims, 4 Drawing Sheets

OPTICAL PICKUP DEVICE FOR WRITING INFORMATION TO AN OPTICAL DISK

BACKGROUND OF THE INVENTION

1. Field of the Invention

The present invention relates, in general, to an optical pickup device and apparatus for recording and reproducing information on and from an optical recording medium, such as a compact disk or a digital versatile disk.

2. Description of the Related Art

Recently, with the development of information and communication technology, networks, such as the Internet, have been rapidly popularized, so that a, large quantity of information has been actively exchanged through the networks. In such conditions, a read-only optical disk, such as a Compact Disk-Recordable (CD-R), or a rewritable optical disk, such as CD-Rewritable (CD-RW), has been spotlighted as a recording medium. Recently, an optical disk having a large capacity, such as Digital Versatile Disk (DVD)-R, DVD-RW and DVD-Random Access Memory (RAM), has been used as an information recording medium, as the wavelength of a semiconductor laser, a laser light source, is shortened, the diameter of a focal spot of an objective lens with a high Numerical Aperture (NA) is decreased, and a thin substrate is employed.

The recording of information on a CD-R or the like is executed after converting write data obtained from a Personal Computer (PC), etc. into Eight to Fourteen Modulation (EFM) signals. In this case, a problem arises in that marks are poorly formed due to the heat accumulation and insufficient cooling speed of an optical disk attributable to the difference between the compositions of the dye recording layers of optical disks being used. Therefore, even though EFM signals are required to be recorded without change, required lands or spaces cannot be formed.

Therefore, there has been employed a scheme of determining a unique write parameter of each of optical disks being used (hereinafter referred to as a "write strategy") with respect to a write waveform which is a reference, and then maintaining an excellent write quality. However, this scheme is disadvantageous in that the load of a developer is increased to determine unique write strategies for respective optical disks being used, differences arise in write strategies, set using skillfulness based on previous experiences, and consequently differences arise in write qualities.

Further, recently, as demands for the recording on an optical disk at a high density or at a high speed are further increased, the width of a write pulse becomes fine in response to the demands.

However, for example, if the fine write pulse is generated at a pickup drive of an optical disk system and then provided to a semiconductor laser in an optical pickup through a flexible cable or the like, a write pulse having an exact shape cannot be transmitted due to the influence of the resistance or capacitance of the flexible cable.

Further, in order to produce high quality write data, it is necessary to vary write conditions according to the unique properties of optical pickups, as well as the compositions of dye recording layers constituting each optical disk or write speeds. However, it is difficult to learn the unique properties of an optical pickup at a pickup drive and reflect the learned properties in a write strategy.

Therefore, there has been proposed a technology to vary a write strategy at a pickup drive in consideration of the diameter of the light spot of an optical pickup (for example, refer to Japanese Patent Laid-Open Publication No. 2002-183960) has been proposed, or a technology to vary a write strategy at a pickup drive in consideration of the surrounding temperature of the optical pickup (for example, refer to Japanese Patent Laid-Open Publication No. 2001-297437).

However, the above technologies are problematic in that it is difficult to optimize a write strategy without the help of the pickup drive, and the efforts of a developer of the pickup drive are not improved at all. Further, it is actually difficult for a drive manufacturer, which cannot learn the optical properties of respective optical pickups, to set write strategies, in which the unique properties of optical pickups are reflected, at the pickup drive, as described above.

SUMMARY OF THE INVENTION

Accordingly, the present invention has been made keeping in mind the above problems occurring in the prior art, and an object of the present invention is to provide an optical pickup device and apparatus for recording/reproducing information on/from an optical disk, which improves a write quality while reducing efforts to set a write strategy at the time of designing a pickup drive.

In order to accomplish the above object, the present invention provides an optical pickup device, the device including an optical system for radiating a laser beam emitted from a semiconductor laser onto an optical disk or receiving light reflected from the optical disk to perform writing and reading of information, comprising memory means for storing therein optimum write strategies in consideration of types of optical disks and write speeds; and write signal correcting means for reading a write strategy corresponding to the optical disk being used from the memory means on the basis of an external control signal and correcting a write signal.

According to the present invention, the optical pickup device is provided with the means for storing therein optimum write strategies corresponding to respective optical disks and the means for correcting a write signal on the basis of the write strategies, thus preventing the degradation of the write signal and realizing a write operation with a high write quality.

Preferably, the optical pickup device may further comprise determining means for determining a type of optical disk being used; and write strategy selecting means for selecting the write strategy corresponding to the optical disk type determined by the determining means from the memory means, and providing the selected write strategy to the write signal correcting means.

According to the present invention, the optical pickup device is provided with the determining means for determining the type of optical disk, and the means for selecting a write strategy corresponding to the determined optical disk type from the memory means and providing the selected write strategy to the write signal correcting means, thus realizing a write operation using the optimum write strategy corresponding to the optical disk being used without depending on an externally applied control signal.

Preferably, the write strategies stored in the memory means may be set in consideration of properties of the optical system.

According to the present invention, write strategies stored in the memory means are set and adopted in consideration of the optical system properties of the optical pickup devices, thus realizing a write operation with a high write quality by the unique write strategies for the optical pickup devices.

Preferably, the properties of the optical system may include at least one parameter of a wavelength of the semiconductor laser, a shape of a light spot formed on the optical disk, and a radiation angle of the semiconductor laser.

According to the present invention, the properties of the optical system include at least one parameter of the wavelength of the semiconductor laser greatly influencing the setting of the write strategy, the shape of the light spot formed on then optical disk, and the radiation angle of the semiconductor laser, so that the write strategy is set in consideration of such a parameter, thus enabling a write operation with a high write quality.

Preferably, the write strategies stored in the memory means may be set so that a rate of a write pulse width of write strategy data is increased to a predetermined rate as the wavelength of the semiconductor laser is lengthened.

Preferably, the write strategies stored in the memory means may be set so that a rate of a write pulse width of a multi-pulse is decreased to a predetermined rate as a radiation angle of a laser beam of the semiconductor laser with respect to a direction of a track of the optical disk is decreased.

Preferably, the write strategies stored in the memory means may be set so that a rate of a write pulse width of a multi-pulse is decreased to a predetermined rate as a size of a light spot formed on the optical disk in a direction of a track of the optical disk is increased.

In addition, the present invention provides an apparatus for recording/reproducing information on/from an optical disk, the apparatus having the optical pickup device in which unique write strategies for optical disks with a high use frequency are stored in the memory means, the apparatus comprising sub-memory means for storing therein unique write strategies for optical disks with a low use frequency; and write strategy writing means for selecting a write strategy corresponding to an optical disk being used from the sub-memory means and writing the selected write strategy in the memory means.

According to the present invention, since optimum write strategies corresponding to respective optical disks are stored in the memory means within the optical pickup device, the degradation of write signals can be prevented and a write operation with a high write quality can be realized. Further, unique write strategies for optical disks with a high use frequency are stored in the memory means within the optical pickup device, and unique write strategies for optical disks with a low use frequency are stored in the memory means within the pickup drive, thus reducing the load of the memory means within the optical pickup device.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
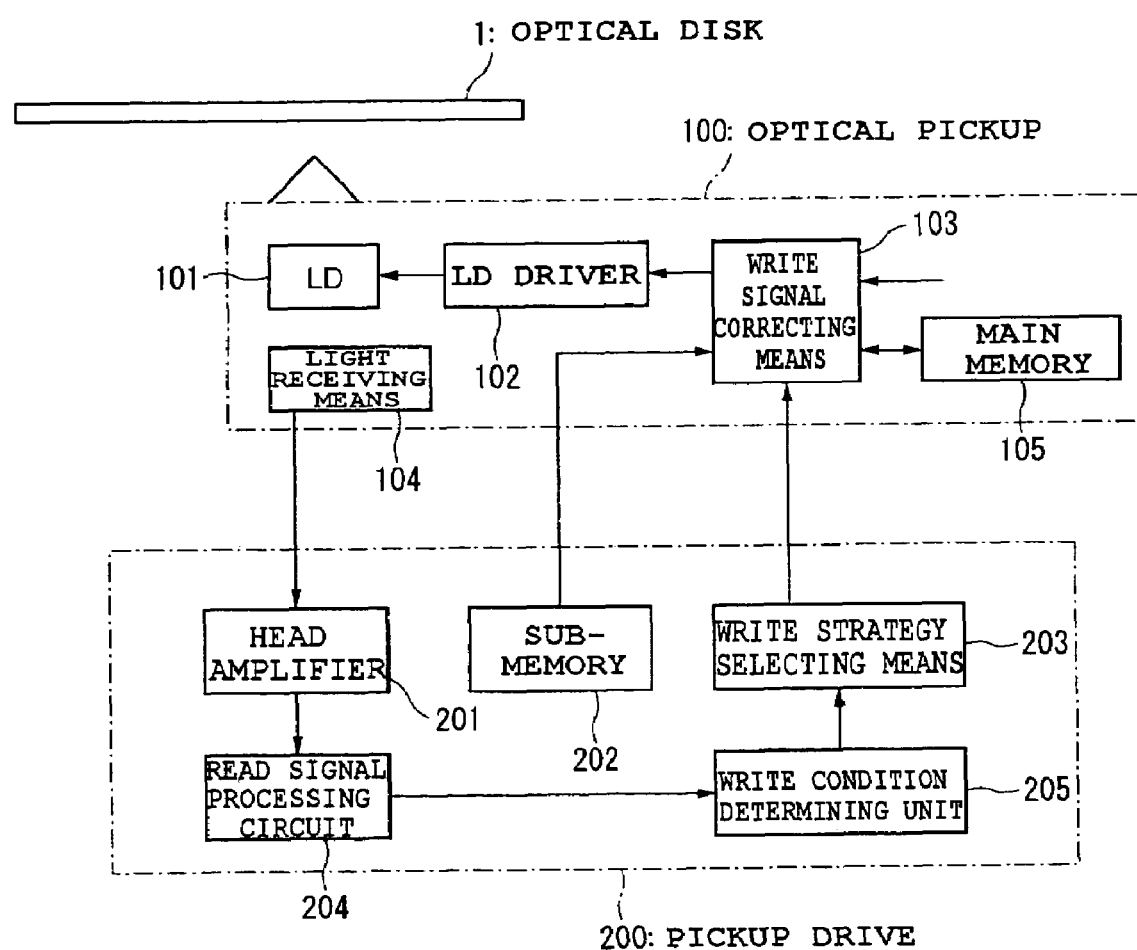
FIG. 1 is a view showing the construction of an optical pickup device and apparatus for recording/reproducing information on/from an optical disk according to a first embodiment of the present invention.

Hereinafter, an optical pickup device and apparatus for recording/reproducing information on/from an optical disk according to embodiments of the present invention will be described in detail with reference to FIG. 1 to FIGS. 3a and 3b.

Reference now should be made to the drawings, in which the same reference numerals are used throughout the different drawings to designate the same or similar components.

First embodiment

As shown in FIG. 1, an apparatus for recording/reproducing information on/from a compact disk according to an embodiment of the present invention includes an optical pickup device 100 and a pickup drive 200, wherein the optical pickup device 100 is comprised of a Laser Diode (LD) 101, an LD driver 102, a write signal correcting means 103, a light receiving means 104 and a main memory 105.

The LD 101, which is a semiconductor laser source, records information on an optical disk by focusing laser beams onto the optical disk and guiding reflected light to the light receiving means 104 by focusing laser beams onto a recording track of the optical disk, through the use of the elements of an optical system within the optical pickup device 100, such as a collimator lens (not shown), an objective lens (not shown) driven by a focus actuator or tracking actuator, a polarization beam splitter (not shown), and a cylindrical lens (not shown).

The LD driver 102 is a driving means for supplying desired optical output power or a current corresponding to a write pulse to the LD 101. The write signal correcting means 103 performs a predetermined correction with respect to a write signal input from, for example, an external Personal Computer (PC), using write strategies stored in the main memory 105, and generates a signal used to form a space or a mark corresponding to the write signal on the optical disk 1.

The light receiving means 104 converts light reflected from the optical disk 1 into an electrical signal, and is comprised of four-segmented or two-segmented photodetectors (PDs). Further, the light receiving means 104 may include a front monitor diode for monitoring a laser output at the time of recording/reproducing information. The main memory 105 is a storage device for storing therein, in particular, the write strategies for optical disks with a high use frequency, and is implemented with a recordable Random Access Memory (RAM).

In the meantime, the pickup drive 200 includes a head amplifier 201, a sub-memory 202, a write strategy selecting means 203, a read signal processing circuit 204 and a write condition determining unit 205.

The head amplifier 201 detects the light reflected from the optical disk 1, and calculates the amount of the reflected light to generate an RF signal representing the total amount of light reflected to respective regions of a four-segmented PD, to generate a Focus Error (FE) signal representing the focus deviation of a laser beam radiated from the optical pickup device 100 using an astigmatism method, and to generate a Tracking Error (TE) signal representing the deviation of the laser beam of the optical pickup device 100 from tracks using a push-pull method.

The sub-memory 202 is a storage device for storing therein, in particular, write strategies for optical disks having a low use frequency, and is implemented with, for example, a recordable RAM or etc. The write strategy selecting means 203 commands the write signal correcting means 103 to read a write strategy corresponding to the optical disk being used 1 from the main memory 105 on the basis of information obtained by the write condition determining unit 205.

The read signal processing circuit 204 reads information, such as Identification (ID) or write speed of the optical disk 1 from the RF signal generated by the head amplifier 201, and outputs the read information to the write condition determining unit 205. Further, the read signal processing circuit 204 generates control signals for a servo system, such as focus, tracking, spindle and carriage, on the basis of the signals input from the head amplifier 201. The write condition determining unit 205 generates write strategy selection information on the basis of the information input from the read signal processing circuit 204.

In the information recording/reproducing apparatus of the present invention, a spindle motor (not shown) on which the optical disk 1 is mounted is rotated, and a setup operation of the servo system is executed. After the setup operation has been completed, the optical pickup device 100 performs an operation of searching data at a predetermined address so as to read disk information from the optical disk 1. If the optical pickup device 100 moves to the predetermined address, laser beams are focused onto the optical disk 1, and laser beams reflected from the optical disk 1 are received by the light receiving means 104.

The laser beams incident on the plurality of photodetectors constituting the light receiving means 104 are converted into a plurality of electrical signals and then input to the head amplifier 201. The head amplifier 201 calculates the plurality of input electrical signals to generate an RF signal, and output the RF signal to the read signal processing circuit 204. The read signal processing circuit 204 converts the input analog RF signal into a digital signal, restores the digital signal to the original analog RF signal and outputs the analog RF signal to the write condition determining unit 205.

The write condition determining unit 205 extracts unique information of the optical disk 1 being used, such as disk ID or write speed, from the input signal, and outputs the extracted information to the write strategy selecting means 203. The write strategy selecting means 203 searches for an optimum write strategy on the basis of the input information, and outputs information of the optimum write strategy to the write signal correcting means 103.

The write signal correcting means 103 reads, on the basis of the input information, a write strategy corresponding to an optical disk from the main memory 105 if the optical disk is a disk with a high use frequency, or from the sub-memory 202 if the optical disk is a disk with a low use frequency, and corrects an externally applied write signal. The corrected write signal is provided to the LD driver 102, which performs a write operation by supplying a drive current corresponding to the corrected write signal to the LD 101.

Next, write strategies stored in the memories are described in detail.

As described above, the write strategies need to be optimized depending on unique properties of an optical disk being used, a write speed or optical properties of an optical pickup device. However, in the past, since the setting of write strategies was performed at a pickup drive, an optical pickup manufacturer was required to provide an optical design not influencing write strategies, without the investigation of unique optical properties of a mounted optical pickup device and the reflection of the optical properties in the write strategies, thus coping with the optimization of the write strategies.

However, as the optical design of the optical pickup device is precisely made, the write strategies are optimized, while the manufacturing efficiency of the optical pickup device is decreased. From a different point of view, an optical pickup manufacturer manages the optical properties of respective optical pickup devices through a production line. Therefore, if optimum write strategies regarding properties except for optical properties are clarified, it is relatively simple to set optimum write strategies by reflecting the optical properties of the respective optical pickup devices in the optimum write strategies.

In this case, the present invention is characterized in that a memory for storing write strategies, which has been generally mounted in a pickup drive, is mounted in an optical pickup device, and unique optical properties of an optical system constituting the optical pickup device are reflected in the write strategies. Further, in a later description, it is premised that there are write strategies, in which optical system properties are not reflected and which correspond to respective optical disks.

Properties influencing the write strategies, of optical properties of the optical pickup device, include the wavelength of a semiconductor laser, the shape of a light spot formed on an optical disk, and the radiation angle of the semiconductor laser.

Figure 2:
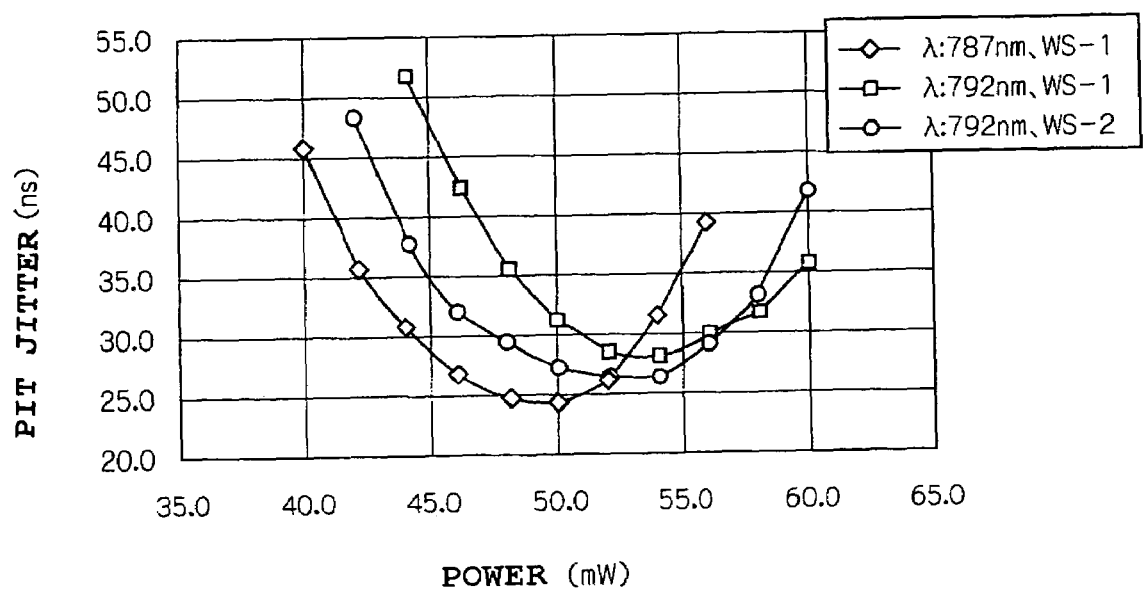
FIG. 2 is a view showing a relationship between write powers and jitter values when information is written while the wavelength of a semiconductor laser is varied.

FIG. 2 is a view showing a relationship between write powers and jitter values when information is written on a CD-R of a specific manufacturer at 40-speed while the wavelength of a semiconductor laser is varied.

Further, in FIG. 2, WS-1 and WS-2 represent write strategies of $(n+0.5)T+\alpha$ and $(n+1)T-\beta$, respectively, and a diamond, a square and a circle represent properties in a case where the wavelength of the semiconductor laser is 787 nm and a write strategy is WS-1, a case where the wavelength of the semiconductor laser is 792 nm and a write strategy is WS-1, and a case where the wavelength of a semiconductor laser is 792 nm and a write strategy is WS-2, respectively.

Referring to FIG. 2, when the wavelength of the semiconductor laser is 787 nm (typical wavelength) and the write strategy is WS-1, a basic jitter value is smallest and write power is lowest. Further, as the wavelength of the semiconductor laser is increased, the basic jitter value is deteriorated and write power is increased. Further, when the wavelength of the semiconductor laser is increased, the basic jitter value can be improved and write power can be decreased by lengthening a write pulse.

As a result of FIG. 2, a write quality can be improved by increasing the rate of a write pulse of the write strategy when the wavelength of the semiconductor laser is long.

Figure 3A:
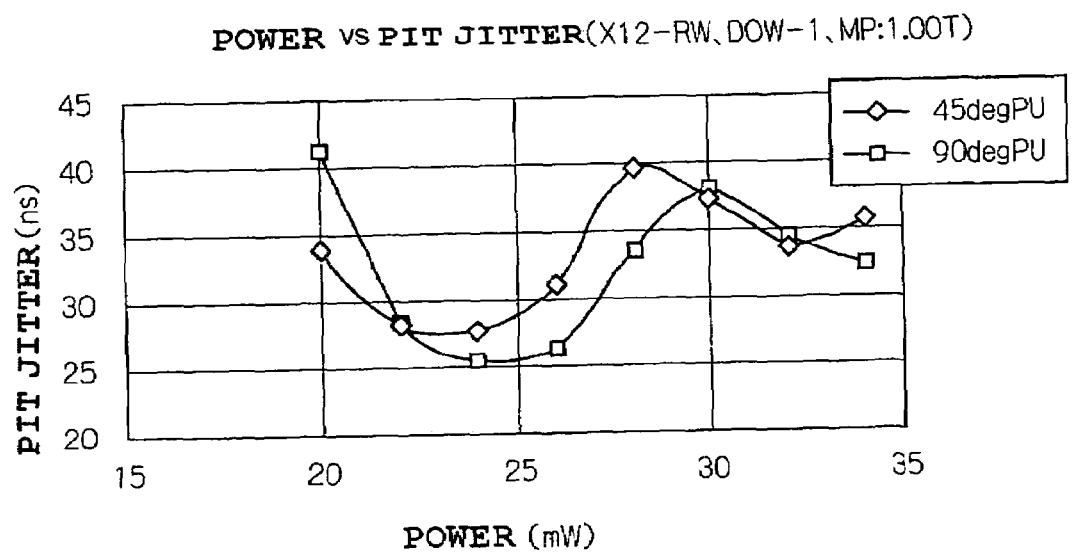
FIGS. 3a and 3b are views showing a relationship between write powers and jitter values when information is written on a CD-RW using optical pickup devices that employ semiconductor lasers having almost similar wavelengths.
Figure 3B:
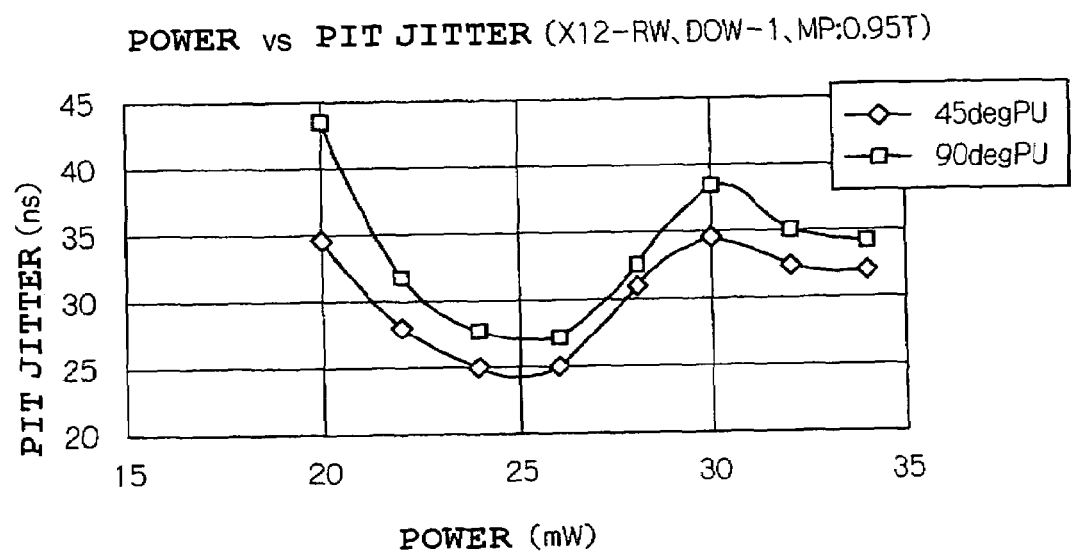

FIGS. 3a and 3b are views showing a relationship between write powers and jitter values when information is written on a CD-RW at 12-speed using optical pickup devices that employ semiconductor lasers having almost similar wavelengths.

In FIGS. 3a and 3b, a diamond and a square represent the properties of an optical pickup device by which a light spot is formed while being inclined to the track of the optical disk at an angle of 45 degrees, and the properties of an optical pickup device by which a light spot is formed while being inclined to the track of the optical disk at an angle of 90 degrees, respectively. Further, FIGS. 3a and 3b show a case where a multi-pulse width is 1.00 T and a case where a multi-pulse width is 0.95 T, respectively. Further, the reason for using two types of optical pickups is to equivalently simulate a difference between areas occupied by focal spots on pits formed in the optical disk.

Referring to the properties of FIGS. 3a and 3b, the optical pickup device by which a spot is formed while being inclined to the optical disk track at an angle of 45 degrees generally has an excellent jitter value. Further, as the multi-pulse width is widened, a jitter value is generally excellent.

Therefore, the shape of a light spot is large. That is, a write strategy is set by reducing the multi-pulse width in an optical pickup device by which an area occupied by a focal spot on a pit formed in the optical disk is large, thus improving a write quality.

Second embodiment

Figure 4:
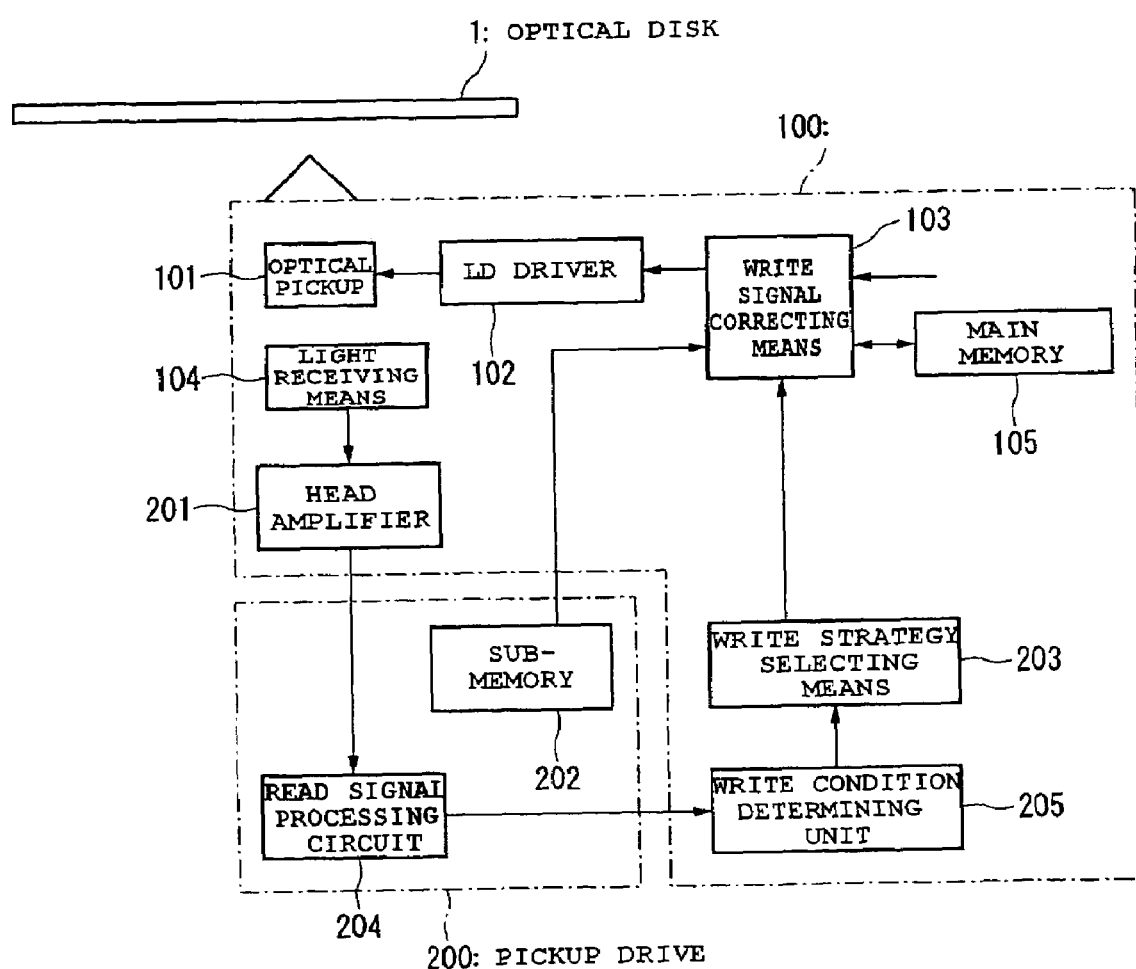
FIG. 4 is a view showing the construction of an optical pickup device and apparatus for recording/reproducing information on/from an optical disk according to a second embodiment of the present invention.

FIG. 4 is a view showing the construction of an optical pickup device and apparatus for recording/reproducing information on/from an optical disk according to a second embodiment of the present invention. The components of the information recording/reproducing apparatus according to the second embodiment are almost equal to those of the first embodiment of FIG. 1. However, the second embodiment is characterized in that a head amplifier 201, a write condition determining unit 205 and a write strategy selecting means 203, which are mounted in the pickup drive 200 in the first embodiment, are installed in the optical pickup device 100. Through the above construction, the selection of optimum write strategies corresponding to optical disk types or write speeds is carried out by the optical pickup device 100, so that the optical pickup device 100 can personally control and execute a series of processes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. That is, in the embodiments of the present invention, only a CD-R and a CD-RW are described as examples of disks. However, the present invention is not limited to the embodiments, but variously applied to optical disks, such as DVD-R or DVD-RW.

In accordance with the present invention, there is an advantage in that unique write strategies are stored in an optical pickup device, so that the number of manufacturing processes required for the design of a pickup drive can be greatly reduced.

Further, the present invention is advantageous in that unique write strategies suitable for the properties of respective optical pickup devices are stored, so that a gap between write qualities is reduced and production efficiency is improved.

Moreover, the present invention is advantageous in that memories are provided in both an optical pickup device and a pickup drive, thus reducing the load of a memory within the optical pickup device and miniaturizing the memory.

What is claimed is:

1. An optical pickup device, including an optical system for radiating a laser beam emitted from a semiconductor laser onto an optical disk or receiving light reflected from the optical disk to perform writing and reading of information, the optical pickup device comprising:
   memory means for storing optimum write strategies depending on types of optical disks, write speeds and properties of the optical system; and
   write signal correcting means for reading a write strategy corresponding to the optical disk from the memory means in response to an external control signal, and for correcting a write signal based on the write strategy,
   wherein the properties of the optical system comprise at least one of a wavelength of the semiconductor laser, a shape of a light spot formed on the optical disk and a radiation angle of the semiconductor laser.

2. The optical pickup device according to claim 1, further comprising:
   determining means for determining a type of the optical disk; and
   write strategy selecting means for selecting the write strategy corresponding to the optical disk type determined by the determining means, and for identifying the selected write strategy to the write signal correcting means.

3. The optical pickup device according to claim 1, wherein the write strategies stored in the memory means are set so that a write pulse width of write strategy data is increased to a predetermined value as the wavelength of the semiconductor laser is lengthened.

4. The optical pickup device according to claim 1, wherein the write strategies stored in the memory means are set so that a write pulse width of a multi-pulse is decreased to a predetermined value as a radiation angle of the laser beam of the semiconductor laser with respect to a direction of a track of the optical disk is decreased.

5. The optical pickup device according to claim 1, wherein the write strategies stored in the memory means are set so that a write pulse width of a multi-pulse is decreased to a predetermined value as a size of the light spot formed on the optical disk in a direction of a track of the optical disk is increased.

6. An apparatus for recording/reproducing information on/from an optical disk, the apparatus having the optical pickup device of claim 1, the apparatus comprising:
   sub-memory means for storing unique write strategies for optical disks with a low use frequency;
   wherein the write signal correcting means reads the write strategy corresponding to a lowe use frequency optical disk from the sub-memory means.

7. An optical pickup device, including an optical system for radiating a laser onto an optical disk to write information on the optical disk, the optical pickup device comprising:
   a memory for storing a plurality of write strategies each write strategy depending on a type of optical disk, wa write speed and at least one property of the optical pickup device; and
   a write signal corrector for reading a selected write strategy of the plurality of write strategies from the memory and for correcting a write signal based on the selected write strategy,
   wherein the at least one property of the optical pickup device comprises at least one of a wavelength of the laser, a shape of a light spot formed on the optical disk and a radiation angle of the semiconductor laser.

8. The optical pickup device according to claim 7, wherein the write signal corrector reads the selected write strategy from the memory in response to an input identifying the selected write strategy.

9. The optical pickup device according to claim 8, further comprising:
   a write strategy selector for determining the selected write strategy corresponding to the type of the optical disk and the write speed, and for providing the input identifying the selected write strategy to the write signal corrector.

10. The optical pickup device according to claim 7, wherein at least one write strategy of the plurality of write strategies stored in the memory comprises increasing a write pulse when the wavelength of the laser increases.

11. The optical pickup device according to claim 7, wherein at least one write strategy of the plurality of write strategies stored in the memory comprises decreasing a multi-pulse width when a radiation angle of the laser decreases.

12. The optical pickup device according to claim 7, wherein at least one write strategy of the plurality of write strategies stored in the memory comprises decreasing a multi-pulse width when a size of the light-spot formed on the optical disk increases.

13. An apparatus, including the optical pickup device of claim 7, for recording information on an optical disk, the apparatus comprising:
   a sub-memory for storing a second plurality of write strategies for optical disk types having a low use frequency,
   wherein the write signal corrector reads a selected write strategy of the second plurality of write strategies from the sub-memory for a low use frequency optical disk.

14. An optical pickup device, comprising:
   a laser diode for writing information on an optical disk;
   a memory for storing a write a write strategy, which depends on a type of optical disk, a write speed and at least one property of the optical pickup device; and
   a write signal corrector for reading the write strategy from the memory and for correcting a write signal based on the write strategy,
   wherein the at least one property of the optical pickup device comprises at least one of a wavelength of the laser, a shape of a light spot formed on the optical disk and a radiation angle of the semiconductor.

15. The optical pickup device according to claim 14, further comprising:
   a write condition determining unit for determining a type of the optical disk; and
   a write strategy selector for selecting the write strategy based on the type of the optical disk, the write strategy selector identifying the write strategy to the write signal corrector for reading the write strategy from the memory.

16. The optical pickup device according to claim 14, wherein the write strategy comprises increasing a write pulse when the wavelength of the laser increases.

17. The optical pickup device according to claim 14, wherein the write strategy comprises decreasing a multi-pulse width when a radiation angle of the laser decreases.

18. The optical pickup device according to claim 14, wherein the write strategy comprises decreasing a multi-pulse width when a size of the light spot formed on the optical disk increases.

* * * * *